(12) United States Patent
Hall et al.

(10) Patent No.: US 7,917,435 B2
(45) Date of Patent: Mar. 29, 2011

(54) APPARATUS AND METHOD FOR FACILITATING ACCOUNT RESTRUCTURING IN AN ELECTRONIC BILL PAYMENT SYSTEM

(75) Inventors: Gidget A Hall, Town and Country, MO (US); Darlene M Lohman, Bartelso, IL (US); Pauline Ow, Chesterfield, MO (US); Edward G McLaughlin, Newtown, PA (US); Janet M Smith, Des Peres, MO (US); Theresa L Altman, St Peters, MO (US)

(73) Assignee: MasterCard International Incorporated, Purchase, NY (US)

( * ) Notice: Subject to any disclaimer, the term of this patent is extended or adjusted under 35 U.S.C. 154(b) by 0 days.

(21) Appl. No.: 11/829,988

(22) Filed: Jul. 30, 2007

(65) Prior Publication Data

US 2008/0046364 A1 Feb. 21, 2008

Related U.S. Application Data

(60) Provisional application No. 60/838,523, filed on Aug. 17, 2006.

(51) Int. Cl.
*G06F 17/60* (2006.01)
(52) U.S. Cl. ............... 705/40; 705/39; 705/42; 705/18
(58) Field of Classification Search ............. 705/42, 705/18
See application file for complete search history.

(56) References Cited

U.S. PATENT DOCUMENTS

| | | | |
|---|---|---|---|
| 5,913,202 A * | 6/1999 | Motoyama | 705/36 R |
| 7,080,035 B1 * | 7/2006 | Williams et al. | 705/40 |
| 7,246,226 B1 * | 7/2007 | Bowers et al. | 713/1 |
| 2002/0007343 A1 * | 1/2002 | Oyama et al. | 705/39 |
| 2003/0225688 A1 * | 12/2003 | Dobbins | 705/39 |
| 2005/0021456 A1 * | 1/2005 | Steele et al. | 705/39 |
| 2006/0106694 A1 * | 5/2006 | Carlson et al. | 705/35 |
| 2006/0116949 A1 * | 6/2006 | Wehunt et al. | 705/35 |
| 2006/0190374 A1 * | 8/2006 | Sher | 705/35 |
| 2006/0235899 A1 * | 10/2006 | Tucker | 707/200 |
| 2007/0271603 A1 * | 11/2007 | Lee et al. | 726/9 |
| 2008/0065520 A1 | 3/2008 | Hazlehurst et al. | |

OTHER PUBLICATIONS

"Street Talk: Merrill Creates Low Expectations for New Asset Account" by Jed Howitz: On Wall Street, Aug. 1, 1999, Thomson Media.*

(Continued)

*Primary Examiner* — Shahid R Merchant
*Assistant Examiner* — Mary Gregg
(74) *Attorney, Agent, or Firm* — Otterstedt, Ellenbogen & Kammer, LLP; Leonardo Renna; Paul J. Otterstedt

(57) ABSTRACT

A system can have a plurality of participating entities including a plurality of receivers and a plurality of originators. A data file indicative of an account restructuring of a given one of the receivers can be obtained. The data file specifies at least one old account number associated with the receiver and at least one new account number associated with the receiver. The data is placed in a conversion data structure in a format to facilitate account number conversion. Remittance data, including the old or new account number of the receiver, is obtained from a given one of the participating entities, and is routed in accordance with the old or new account number in the remittance data, and the data structure.

31 Claims, 2 Drawing Sheets

OTHER PUBLICATIONS

"Halifax Savings Account; Money Matters" bu Diana Wright Jul. 16, 2000; Halifax Group PLC; The Sunday Times Guide to Personal Finance at money.matters@sunday-times.co.uk.*

"Chemical's promise. (Chemical Bank promises customers $5 if account transfers between Chemical and Manufacturers Hanover Trust are botched) (Brief Article)." American Banker. SourceMedia, Inc. 1992. HighBeam Research. Jan. 2, 2010 <http://www.highbeam.com>.*

"Mastercard Payment Gateway, e-P3." Downloaded from http://www.mastercard.com/us/business/en/corporate/purchasingsolutions/integration/ep3/paymentgateway.html.

"Mastercard Remote Payment and Presentment Services," Downloaded from http://www.mastercardintl.com/rpps/lvl2.cgi/about_1.

* cited by examiner

APPARATUS AND METHOD FOR FACILITATING ACCOUNT RESTRUCTURING IN AN ELECTRONIC BILL PAYMENT SYSTEM

CROSS-REFERENCE TO RELATED APPLICATIONS

This patent application claims the benefit of U.S. Provisional Patent Application Ser. No. 60/838,523 filed on Aug. 17, 2006, and entitled "Apparatus and Method for Facilitating Account Restructuring in an Electronic Bill Payment System." The disclosure of the aforementioned Provisional Patent Application Ser. No. 60/838,523 is expressly incorporated herein by reference in its entirety.

FIELD OF THE INVENTION

The present invention relates generally to the electronic and computer arts, and, more particularly, to apparatus and methods for electronic payments.

BACKGROUND OF THE INVENTION

Electronic bill presentment and payment is widely used. Portfolios of accounts may need to be converted to new account numbers or structures. Currently, such conversion is typically handled outside of the electronic bill payment system. Billers may develop proprietary solutions requiring manual research and posting of payments, resulting in delay, expense, and potential errors.

Parties using electronic payment systems, such as on-line bill paying, may not always review paper statements or notices received from billers, and thus may not update the biller account when changes occur, causing payments to fail. Such payments may become unpostable, received by the wrong party, or rejected by the system.

It would be desirable to overcome the deficiencies of prior art techniques

SUMMARY OF THE INVENTION

Principles of the present invention provide techniques for facilitating account restructuring in an electronic bill payment system. In one aspect, an exemplary method for facilitating such restructuring is employed with a system with a plurality of participating entities including a plurality of receivers and a plurality of originators The method can include the step of obtaining a data file indicative of an account restructuring of a given one of the receivers. The data file specifies at least one old account number associated with the receiver and at least one new account number associated with the receiver. The method also includes the steps of placing the old and new account numbers of the receiver in a conversion data structure in a format to facilitate account number conversion, and obtaining remittance data from a given one of the participating entities The remittance data includes an indication of the old account number of the receiver or the new account number of the receiver. The remittance data is routed in accordance with the indication of the account number and the data structure In another aspect, an exemplary method for facilitating account restructuring in an electronic bill payment system with a plurality of participating entities comprising a plurality of receivers and a plurality of originators, includes the step of obtaining a data file indicative of an account restructuring of a given one of the receivers. The data file specifies at least one first account number criteria associated with the receiver and at least one second account number criteria associated with the receiver. The method further includes steps of placing the first and second account number criteria of the receiver in a conversion data structure in a format to facilitate account restructuring, and obtaining remittance data from a given one of the originators. The remittance data includes an indication of an account number associated with the receiver. The method still further includes the steps of routing the remittance data to the receiver if the indication of the account number satisfies the first account number criteria, and routing the remittance data back to the given one of the originators if the indication of the account number satisfies the second account number criteria.

Account number conversion can be handled in a number of different situations; by way of example and not limitation, these may include cases where receivers include billers and/or concentrators. Two or more billers may be under the same concentrator, and conversion may be performed from one biller identifier to many biller identifiers, or from many biller identifiers to one biller identifier, or in any desired combination thereof.

An exemplary embodiment of an apparatus, according to another aspect of the invention, can include a memory and at least one processor coupled to the memory The processor can be operative to facilitate performance of one or more of the method steps described herein. In another aspect, the apparatus can comprise means, described herein, for performing the various method steps. One or more method steps of the present invention can be implemented in the form of an article of manufacture comprising a machine readable medium that contains one or more programs that when executed implement such step or steps.

These and other features and advantages of the invention will become apparent from the following detailed description of illustrative embodiments thereof, which is to be read in connection with the accompanying drawings.

DETAILED DESCRIPTION OF PREFERRED EMBODIMENTS

Figure 1:
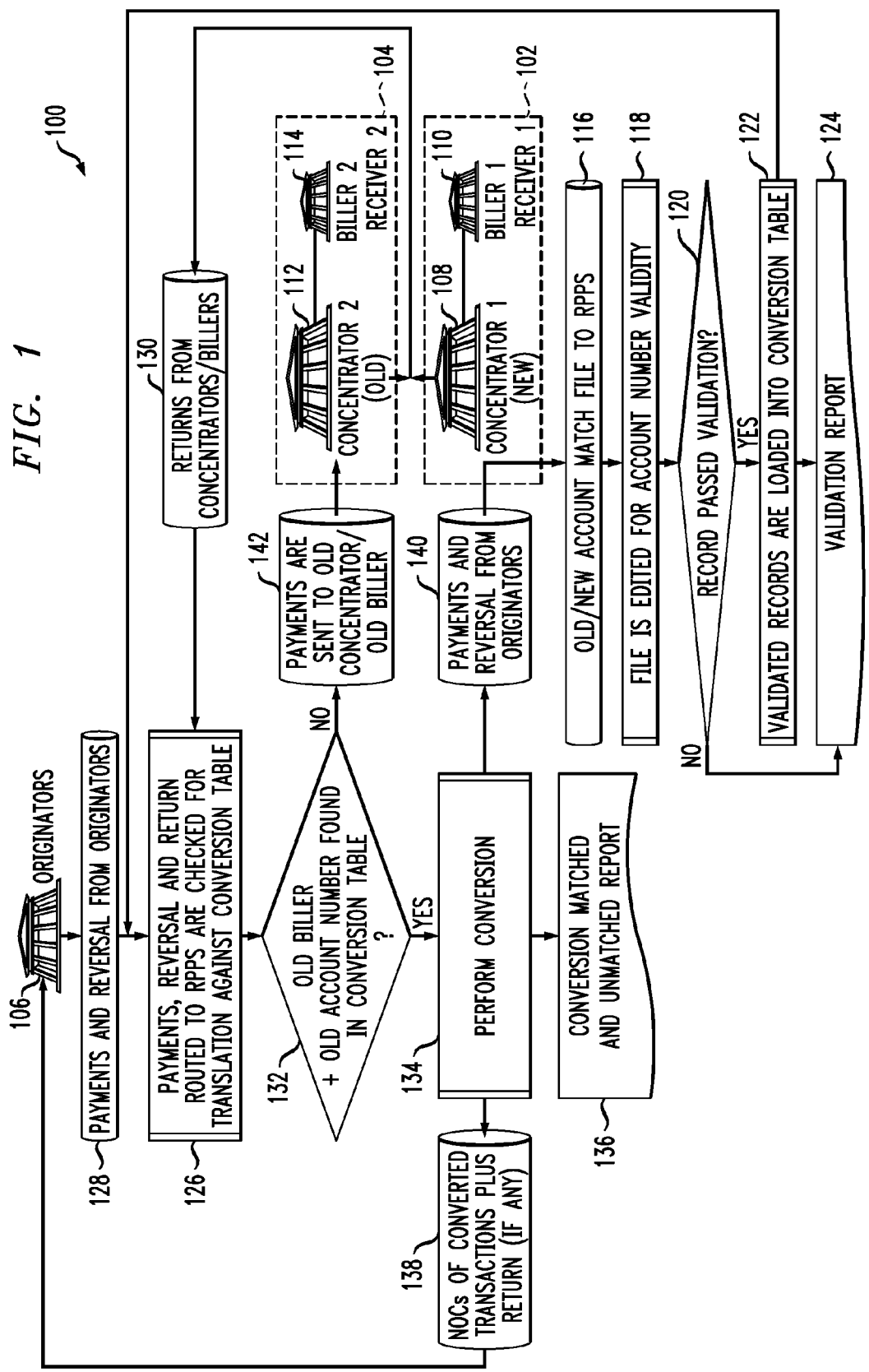
FIG. 1 shows a flow chart exemplary of techniques of an embodiment of the invention.

Attention should now be given to FIG. 1, which depicts a flow chart 100 of exemplary method steps in a method for facilitating account restructuring in an electronic bill payment system, according to an aspect of the invention. The system can have a plurality of participating entities including a plurality of receivers 102, 104 (only two are shown for purposes of illustrative convenience) and a plurality of originators 106 (shown as a single block for illustrative convenience). The receivers can include concentrators and/or billers. Thus, by way of example and not limitation, the first receiver 102 can include concentrator 108 and biller 110, while the second receiver 104 can include concentrator 112 and biller 114. It will be appreciated that the billers 110, 114 can be under different concentrators 108, 112 as shown, or could both be under the same concentrator. Billers 110, 114 may each have a biller identifier (biller ID). Translation techniques described herein can be carried out, e.g., from one biller ID to many biller IDs, or from many biller IDs to one biller ID, or in any desired combination.

The method can include the step 116 of obtaining a data file indicative of an account restructuring of a given one of the receivers 102. The data file specifies at least one old account number associated with the receiver and at least one new account number associated with the receiver (there could be, for example, more than one new account number associated with the receiver). The method can also include placing the old and new account numbers of the receiver in a conversion data structure in a format to facilitate account number conversion, as at step 122 (the data structure can be, for example, a conversion table). Further, the method can include obtaining remittance data 128, 130 from a given one of the participating entities. The remittance data can include, for example, payments and/or reversals from one or more originators, as at block 128. The remittance data can also include, in addition to or in lieu of the payments and/or reversals, returns from receivers, as at block 130. The remittance data typically includes an indication of the old account number of the receiver or the new account number of the receiver. That is, payments or reversals from an originator might include the old account number that needed to be converted to the new account number, while returns from receivers might include the new account number that had already been converted and needed to be converted back to avoid confusing the originator.

The method can also include the step of routing the remittance data in accordance with the old or new account number of the receiver, as the case may be; and the data structure. One manner of routing is depicted in blocks 126, 132, 134, 138, and 140, to be discussed more fully below. The remittance data can potentially be routed to more than one destination. The routing step can include routing the payment and/or reversal to a single new account number associated with the receiver, which could be, for example, a new account of the receiver; or a number of an account of a third party, e.g., an assignee of the accounts receivable of the original receiver. As noted, in addition to account number information, remittance data can include identification data such as a biller ID (broadly understood to encompass identification of a biller or concentrator). The aforementioned data file can specify a new destination receiver identification identifying the third party, such as a new biller ID identifying the assignee.

Where, for example, a single biller portfolio is sold to multiple billers, the data file can specify a plurality of new account numbers associated with the old account number of the receiver; and the routing step can include routing the remittance data in accordance with the plurality of new account numbers associated with the old account number of the receiver. Rules can be provided to determine where a given payment, reversal, or return goes. For example, suppose First Bank of Smithtown sells its portfolio to Acme Bank and Baker Bank. Some subset of the old accounts could be assigned to Acme Bank and another set to Baker Bank, based on account numbers or some other criteria. For example, some range of old account numbers could go to a first one of the new accounts (associated with Acme Bank) and another to a second of the new accounts (associated with Baker Bank).

Thus, in the case of a payment and/or a reversal from a given one of the originators, the routing step could include routing the payment or reversal, as the case may be, in accordance with the plurality of new account numbers associated with the old account number of the receiver, by routing the payment or reversal to a first one of the plurality of new account numbers if the payment or reversal satisfies first account number criteria and to a second one of the plurality of new account numbers if the payment or reversal satisfies second account number criteria. Again, the account number criteria could be ranges of account numbers, including portions of account numbers, account masks, some type of formula, and the like.

Optionally, the method can include the additional step of checking the data file, for example, by carrying out steps 118 and 120. Step 118 can include, for example, running a check digit routine against the old and new account numbers, and/or verifying account masks for the old and new account numbers. Step 120 can include determining whether the data filed passed the check digit routine and the verifying account masks step. In another optional step 124, a validation report can be generated. Such report could be maintained in house by an entity performing the conversion, or could be given to the receiver automatically or upon request of the receiver. Step 124 can be conducted if a record from a data file fails validation, as shown at the "N" branch of decision block 120, and if desired, can also be performed if the record passes validation, as shown by the side arrow from block 122.

As shown at block 138, the method can also include the additional step of preparing a notice of change of a converted transaction for the originator. As will be discussed further herein, the notice of change can be sent to the originator, as can returns from receivers. The notice of change can be sent, e.g., in the form of a transaction, to alert the originator to the account number change, and can include, e.g., the original payment data, new account number; and destination biller ID if applicable.

Further details will now be provided regarding the aforementioned routing step, which can include, for example, checking the remittance data, as at 126 to determine, as at 132, whether the old account number of the receiver or the new account number of the receiver, as the case may be, is contained in the data structure. Further, routing can include performing conversion as at block 134. This can include, e.g., identifying the payment remittance data as destined for the new account number of the receiver (where remittance data has old number) or the old account number of the receiver (where remittance data has new number), responsive to the old account number of the receiver being contained in the data structure in association with the new account number of the receiver, or the new account number of the receiver being contained in the data structure in association with the old account number of the receiver. By way of explanation, for a payment and/or reversal 128 from an originator, the old account number could be converted to the new account number, with routing to the correct receiver account as at block 140, while for a return 130 from a receiver, the new account number could be converted back to the old account number for routing back to the originator as at block 138, to avoid confusing the originator when the return is received. Note that if the old biller ID and old account number are not found in the table, as at the "N" branch of block 132, the payment and/or reversal is simply sent to the usual ("old") receiver as at block 142. Similarly, returns with no conversion data in the table can simply be processed in the usual way.

As shown at block 136, an additional optional step can include preparing a conversion matched and unmatched report, based steps such as 132 and/or 134. Such report can summarize what has and has not been converted, and it desired, can be sent to corresponding appropriate parties. The report can track payments converted and rerouted. Appropriate parties to receive the report can include billers with converting portfolios, affected originators, and the entity maintaining the systems Billers could use the data to contact entities using the wrong account number.

Another optional method step can include repeating the step 116 of obtaining the data file, the step 122 of placing the file in the structure, the step 126 of obtaining remittance data, and the step (e.g., 132, 134, 138, 140) of routing the data, for at least a second data file indicative of an account restructuring of at least another given one of the receivers (for example, when several receivers (say 102 and 104) are restructuring). In another aspect, one could repeat the step 126 of obtaining remittance data and the step (e.g., 132, 134, 138, 140) of routing the data, for at least second remittance data from at least another given one of the originators (for example, where multiple originators are still using the old account number).

If desired, the method steps can be carried out indefinitely, until a stop request is obtained from the given receiver.

By way of further discussion of a "return" scenario, in such case, the given one of the participating entities is a given one of the receivers 102, 104, and the remittance data is a return 130 of a prior payment from a given one of the originators 106 to the given one of the receivers. The prior payment has been converted from the old account number of the given one of the receivers to the new account number of the given one of the receivers, and the return includes an indication of the new account number of the given one of the receivers. The routing step in this case can include converting the indication of the new account number of the given one of the receivers to an indication of the old account number of the given one of the receivers, so that the party receiving the return is not confused by receiving the return with an account number they are not familiar with. Routing, as used herein, including the claims, is to be broadly understood to encompass the cases of payments and/or reversals from an originator, and returns from a receiver.

In another aspect, a method for facilitating account restructuring in an electronic bill payment system of the kind described can include obtaining a data file, as at 116, indicative of an account restructuring of a given one of the receivers 102. The data file specifies at least one first account number criteria, such as a range, associated with the receiver and at least one second account number criteria, such as another range, associated with the receiver. The first and second account number criteria of the receiver can be placed in a conversion data structure as at 122, in a format to facilitate account restructuring. Remittance data 128 can be obtained from a given one of the originators, and the remittance data can include an indication of an account number associated with the receiver. The remittance data can be routed to the receiver if the indication of the account number satisfies the first account number criteria, and the remittance data can be routed back to the given one of the originators if the indication of the account number satisfies the second account number criteria. Such a process can be viewed as a reversal and/or deconversion stop file process, and could be implemented, for example, when a receiver only wishes to be paid for some accounts and wishes to reject payments for other accounts. This might occur where a receiver has retained some accounts and assigned others to a different entity. The process is similar to the first process discussed, except that one would have a data structure showing what to accept and what to return. This could be conducted in lieu of or addition to the routing to old and new account numbers.

Inventive techniques can be employed with any type of electronic bill payment system. In one or more embodiments, inventive techniques can be employed with the MASTERCARD RPPS® electronic payment system of MasterCard International Incorporated of Purchase, New York, USA. Techniques of the invention can permit, for example, efficient handling of payment routing and posting challenges inherent in full and partial portfolio conversions. Billers may include, e.g., card issues, telecommunications companies, and utilities. They may have to reissue customer account numbers due to portfolio splits, account transitions due to mergers and acquisitions, card portfolio flips, and the like. One or more embodiments may permit identification of payments requiting account number conversion, conversion of payments to new account numbers, and re-routing of payments from one biller ID to another.

Figure 2:
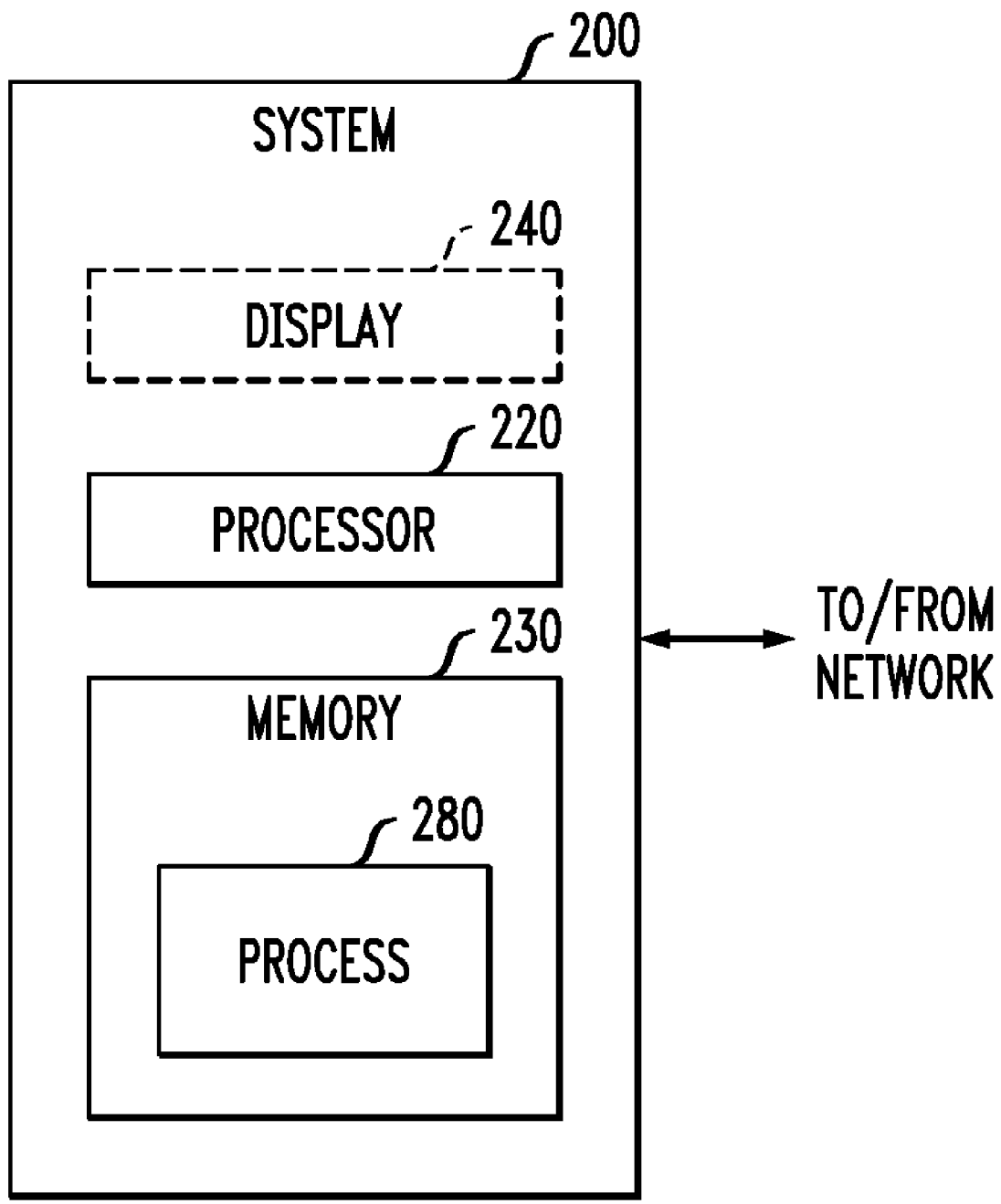
FIG. 2 is a block diagram of an exemplary computer system useful in one or mote embodiments of the invention

Further, one or more inventive embodiments allow accurate posting without impact to billers; and billers, bill payment originators, and bill payers can obtain timely delivery and posting of payments without interruption. It will be appreciated that the data structure mentioned above can store, e.g., conversion data to convert between old and new account numbers. Further, rerouting data can also be stored, for example, to direct a translated payment to a new biller ID when all or part of one biller's portfolio has been sold to another. Account number masks or ranges can also be maintained, for example, when routing in a "one to many" scenario. The data structure can include data from a number of entities. Processing can be carried out in a batch or real-time mode, as desired The invention can employ hardware and/or software aspects. Software includes but is not limited to firmware, resident software, microcode, etc. FIG. 2 is a block diagram of a system 200 that can implement part or all of one or more aspects or processes of the present invention. As shown in FIG. 2, memory 230 configures the processor 220 to implement one or more aspects of the methods, steps, and functions disclosed herein (collectively, shown as process 280 in FIG. 2). The memory 230 could be distributed or local and the processor 220 could be distributed or singular. The memory 230 could be implemented as an electrical, magnetic or optical memory, or any combination of these or other types of storage devices. It should be noted that if distributed processors are employed, each distributed processor that makes up processor 220 generally contains its own addressable memory space. It should also be noted that some or all of computer system 200 can be incorporated into an application-specific or general-use integrated circuit. For example, one or more method steps could be implemented in hardware in an ASIC rather than using firmware. Display 240 is representative of a variety of possible input/output devices. The "means" for performing the various functions set forth in the claims can include, for example, hardware modules including circuitry such as ASICs, software modules, or combinations thereof (for example, hardware and software could be used in combination to perform a given function, or to perform different functions within the same apparatus). In one or more embodiments, techniques of the invention can be implemented using software running on one or more general purpose computers, connected, for example, in a client-server configuration over the Internet (other networks, such as virtual private networks, could also be used)

System and Article of Manufacture Details

As is known in the art, part or all of one or more aspects of the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g, floppy disks, hard drives, compact disks, EEPROMs, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the present invention can make use of computer technology with appropriate instructions to implement method steps described herein. An apparatus could include a memory, and at least one processor coupled to the memory operative to perform one or more method steps set forth herein.

Accordingly, it will be appreciated that one or more embodiments of the present invention can include a computer program comprising computer program code means adapted to perform one or all of the steps of any methods or claims set forth herein when such program is run on a computer, and that such program may be embodied on a computer readable medium. Further, one or more embodiments of the present invention can include a computer comprising code adapted to cause the computer to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for facilitating account restructuring in an electronic bill payment system with a plurality of participating entities comprising a plurality of receivers and a plurality of originators, said method comprising the steps of:
    providing an apparatus, wherein said apparatus comprises a hardware processor and a plurality of software modules embodied on a tangible computer useable recordable storage medium, said hardware processor being configured to execute said software modules, said software modules being configured to interface with said electronic bill payment system, and wherein said software modules comprise a data-file obtaining module, a conversion data structure placement module, a remittance data obtaining module, and a remittance data routing module;
    obtaining a data file indicative of an account restructuring of a given one of said plurality of receivers, said data file specifying at least one old account number associated with said given one of said plurality of receivers and at least one new account number associated with said given one of said plurality of receivers, wherein said obtaining of said data file is performed by said data-file obtaining module, executing on said hardware processor, obtaining said file over a network;
    placing said at least one old account number and said at least one new account number associated with said given one of said plurality of receivers in a conversion data structure in a format to facilitate account number conversion, wherein said placing is performed by said conversion data structure placement module, executing on said hardware processor, storing said conversion data structure in said tangible computer-usable recordable storage medium;
    obtaining remittance data from a given one of said participating entities, said remittance data comprising an indication of one of said old account number of said given one of said plurality of receivers and said new account number of said given one of said plurality of receivers, wherein said obtaining of said remittance data is carried out by said remittance data obtaining module, executing on said hardware processor, obtaining said remittance data over said network; and
    routing said remittance data in accordance with:
        said one of said old account number of said given one of said plurality of receivers and said new account number of said given one of said plurality of receivers; and
        said conversion data structure;
    wherein:
    said routing is performed by said remittance data routing module, executing on said hardware processor, routing said remittance data over said network;
    said remittance data comprises one of a payment and a reversal;
    said given one of said participating entities comprises a given one of said plurality of originators; and
    said routing step comprises routing said one of a payment and a reversal to a single new account number associated with said given one of said plurality of receivers.

2. The method of claim 1, wherein said new account number associated with said given one of said plurality of receivers is a number of a new account of said given one of said plurality of receivers.

3. The method of claim 1, wherein said new account number associated with said given one of said plurality of receivers is a number of an account of a third party.

4. The method of claim 3, wherein said data file specifies a new destination receiver identification identifying said third party.

5. The method of claim 1, wherein:
    each of said receivers in said plurality of receivers comprises at least one of:
        one of a plurality of billers;
        one of a plurality of concentrators; and
        one of said plurality of concentrators acting on behalf of at least one biller of said plurality of billers; and
    each of said originators comprises a bill payment originator.

6. The method of claim 5, wherein said plurality of software modules provided in said providing step further comprise a checking and validation module, further comprising the additional step of checking said data file using said checking and validation module executing on said hardware processor.

7. The method of claim 6, further comprising the additional step of generating a validation report using said checking and validation module executing on said hardware processor.

8. The method of claim 6, wherein said checking step comprises:

running a check digit routine against said old and new account numbers;

verifying account masks for said old and new account numbers; and determining whether said data filed passed said check digit routine and said verifying account masks step.

9. The method of claim 5, wherein said plurality of software modules provided in said providing step further comprise a notice of change preparing module, further comprising the additional step of preparing a notice of change for a given one of said plurality of originators using said notice of change preparing module executing on said hardware processor.

10. The method of claim 5, wherein said routing step comprises:

checking said remittance data to determine whether said one of said at least one old account number associated with said given one of said plurality of receivers and said at least one new account number associated with said given one of said plurality of receivers is contained in said conversion data structure; and identifying said payment remittance data as destined for another one of said at least one old account number associated with said given one of said plurality of receivers and said at least one new account number associated with said given one of said plurality of receivers, responsive to said one of said at least one old account number associated with said given one of said plurality of receivers and said at least one new account number associated with said given one of said plurality of receivers being contained in said conversion data structure in association with said another one of said at least one old account number associated with said given one of said plurality of receivers and said at least one new account number associated with said given one of said plurality of receivers.

11. The method of claim 10, wherein said plurality of software modules provided in said providing step further comprise a conversion report preparing module, further comprising the additional step of preparing a conversion matched and unmatched report based at least on said identifying step, using said conversion report preparing module executing on said hardware processor.

12. The method of claim 5, further comprising the additional step of repeating said obtaining a data file, placing, obtaining remittance data, and routing steps for at least a second data file indicative of an account restructuring of at least another given one of said plurality of receivers, using said data-file obtaining module, said conversion data structure placement module, said remittance data obtaining module, and said remittance data routing module executing on said hardware processor.

13. The method of claim 5, further comprising the additional step of repeating said step of obtaining remittance data, and said step of routing, for at least second remittance data from at least another given one of said plurality of originators, using said remittance data obtaining module and said remittance data routing module executing on said hardware processor.

14. The method of claim 5, further comprising the additional step of repeating said step of obtaining remittance data, and said step of routing, for a plurality of additional remittance data, until a stop request is obtained from said given one of said plurality of receivers, using said remittance data obtaining module and said remittance data routing module executing on said hardware processor.

15. A method for facilitating account restructuring in an electronic bill payment system with a plurality of participating entities comprising a plurality of receivers and a plurality of originators, said method comprising the steps of:

providing an apparatus, wherein said apparatus comprises a hardware processor and a plurality of software modules embodied on a tangible computer useable recordable storage medium, said hardware processor being configured to execute said software modules, said software modules being configured to interface with said electronic bill payment system, and wherein said software modules comprise a data-file obtaining module, a conversion data structure placement module, a remittance data obtaining module, and a remittance data routing module;

obtaining a data file indicative of an account restructuring of a given one of said plurality of receivers, said data file specifying at least one old account number associated with said given one of said plurality of receivers and at least one new account number associated with said given one of said plurality of receivers, wherein said obtaining of said data file is performed by said data-file obtaining module, executing on said hardware processor, obtaining said file over a network;

placing said at least one old account number and said at least one new account number associated with said given one of said plurality of receivers in a conversion data structure in a format to facilitate account number conversion, wherein said placing is performed by said conversion data structure placement module, executing on said hardware processor, storing said conversion data structure in said tangible computer-usable recordable storage medium;

obtaining remittance data from a given one of said participating entities, said remittance data comprising an indication of one of said old account number of said given one of said plurality of receivers and said new account number of said given one of said plurality of receivers, wherein said obtaining of said remittance data is carried out by said remittance data obtaining module, executing on said hardware processor, obtaining said remittance data over said network; and routing said remittance data in accordance with:
said one of said old account number of said given one of said plurality of receivers and said new account number of said given one of said plurality of receivers; and
said conversion data structure;

wherein:

said routing is performed by said remittance data routing module, executing on said hardware processor, routing said remittance data over said network;

said remittance data comprises one of a payment and a reversal;

said data file specifies a plurality of new account numbers associated with said old account number of said given one of said plurality of receivers; and said routing step comprises routing said remittance data in accordance with said plurality of new account numbers associated with said old account number of said given one of said plurality of receivers.

16. The method of claim 15, wherein:

said given one of said participating entities comprises a given one of said plurality of originators; and said routing step comprises routing said one of a payment and a reversal in accordance with said plurality of new account numbers associated with said old account number of said given one of said plurality of receivers by routing said one of a payment and a reversal to a first one of said plurality of new account numbers if said one of a payment and a reversal satisfies first account number criteria and to a second one of said plurality of new account numbers if said one of a payment and a reversal satisfies second account number criteria.

17. A method for facilitating account restructuring in an electronic bill payment system with a plurality of participating entities comprising a plurality of receivers and a plurality of originators, said method comprising the steps of:
providing an apparatus, wherein said apparatus comprises a hardware processor and a plurality of software modules embodied on a tangible computer useable recordable storage medium, said hardware processor being configured to execute said software modules, said software modules being configured to interface with said electronic bill payment system, and wherein said software modules comprise a data-file obtaining module, a conversion data structure placement module, a remittance data obtaining module, and a remittance data routing module;
obtaining a data file indicative of an account restructuring of a given one of said plurality of receivers, said data file specifying at least one old account number associated with said given one of said plurality of receivers and at least one new account number associated with said given one of said plurality of receivers, wherein said obtaining of said data file is performed by said data-file obtaining module, executing on said hardware processor, obtaining said file over a network;
placing said at least one old account number and said at least one new account number associated with said given one of said plurality of receivers in a conversion data structure in a format to facilitate account number conversion, wherein said placing is performed by said conversion data structure placement module, executing on said hardware processor, storing said conversion data structure in said tangible computer-usable recordable storage medium;
obtaining remittance data from a given one of said participating entities, said remittance data comprising an indication of one of said old account number of said given one of said plurality of receivers and said new account number of said given one of said plurality of receivers, wherein said obtaining of said remittance data is carried out by said remittance data obtaining module, executing on said hardware processor, obtaining said remittance data over said network; and
routing said remittance data in accordance with:
said one of said old account number of said given one of said plurality of receivers and said new account number of said given one of said plurality of receivers; and
said conversion data structure;
wherein:
said routing is performed by said remittance data routing module, executing on said hardware processor, routing said remittance data over said network;
said given one of said participating entities comprises a given one of said plurality of receivers;
said remittance data comprises a return of a prior payment from a given one of said plurality of originators to said given one of said plurality of receivers, said prior payment having been converted from said at least one old account number associated with said given one of said receivers to said at least one new account number associated with said given one of said plurality of receivers, said return comprising an indication of said at least one new account number associated with said given one of said plurality of receivers; and said routing comprises converting said indication of said at least one new account number associated with said given one of said receivers to an indication of said at least one old account number associated with said given one of said plurality of receivers.

18. A method for facilitating account restructuring in an electronic bill payment system with a plurality of participating entities comprising a plurality of receivers and a plurality of originators, said method comprising the steps of:
providing an apparatus, wherein said apparatus comprises a hardware processor and a plurality of software modules embodied on a tangible computer useable recordable storage medium, said hardware processor being configured to execute said software modules, said software modules being configured to interface with said electronic bill payment system, and wherein said software modules comprise a data-file obtaining module, a conversion data structure placement module, a remittance data obtaining module, and a remittance data routing module;
obtaining a data file indicative of an account restructuring of a given one of said plurality of receivers, said data file specifying at least one first account number criterion associated with said given one of said plurality of receivers and at least one second account number criterion associated with said given one of said plurality of receivers, wherein said obtaining of said data file is performed by said data-file obtaining module, executing on said hardware processor, obtaining said file over a network;
placing said at least one first account number criterion and said at least one second account number criterion of said given one of said plurality of receivers in a conversion data structure in a format to facilitate account restructuring, wherein said placing is performed by said conversion data structure placement module, executing on said hardware processor, storing said conversion data structure in said tangible computer-usable recordable storage medium;
obtaining remittance data from a given one of said plurality of originators, said remittance data comprising an indication of an account number associated with said given one of said plurality of receivers, wherein said obtaining of said remittance data is carried out by said remittance data obtaining module, executing on said hardware processor, obtaining said remittance data over said network;
routing said remittance data to said given one of said plurality of receivers if said indication of said account number satisfies said at least one first account number criterion; and
routing said remittance data back to said given one of said plurality of originators if said indication of said account number satisfies said at least one second account number criterion;
wherein:
said remittance data comprises a payment; and
said routing steps are performed by said remittance data routing module, executing on said hardware processor, routing said remittance data over said network.

19. The method of claim 18, wherein:
each of said receivers in said plurality of receivers comprises at least one of:
one of a plurality of billers;
one of a plurality of concentrators; and
one of said plurality of concentrators acting on behalf of at least one biller of said plurality of billers; and
each of said originators comprises a bill payment originator.

20. A computer program product comprising a tangible computer useable recordable storage medium including computer usable program code for facilitating account restructuring in an electronic bill payment system with a plurality of participating entities comprising a plurality of receivers and a plurality of originators, said computer program product including:
  computer usable program code for obtaining a data file indicative of an account restructuring of a given one of said plurality of receivers, said data file specifying at least one old account number associated with said given one of said plurality of receivers and at least one new account number associated with said given one of said plurality of receivers;
  computer usable program code for placing said at least one old account number and said at least one new account number associated with said given one of said plurality of receivers in a conversion data structure in a format to facilitate account number conversion;
  computer usable program code for obtaining remittance data from a given one of said participating entities, said remittance data comprising an indication of one of said old account number of said given one of said plurality of receivers and said new account number of said given one of said plurality of receivers; and
  computer usable program code for routing said remittance data in accordance with:
    said one of said old account number of said given one of said plurality of receivers and said new account number of said given one of said plurality of receivers; and
    said conversion data structure;
  wherein:
    said remittance data comprises one of a payment and a reversal;
    said given one of said participating entities comprises a given one of said plurality of originators; and
    said computer usable program code for routing comprises computer usable program code for routing said one of a payment and a reversal to a single new account number associated with said given one of said plurality of receivers.

21. The computer program product of claim 20, wherein:
  each of said receivers in said plurality of receivers comprises at least one of:
    one of a plurality of billers;
    one of a plurality of concentrators; and
    one of said plurality of concentrators acting on behalf of at least one biller of said plurality of billers; and
  each of said originators comprises a bill payment originator.

22. The computer program product of claim 21, wherein said computer usable program code for routing comprises:
  computer usable program code for checking said remittance data to determine whether said one of said old account number of said given one of said plurality of receivers and said new account number of said given one of said plurality of receivers is contained in said data structure; and
  computer usable program code for identifying said payment remittance data as destined for another one of said at least one old account number associated with said given one of said plurality of receivers and said at least one new account number associated with said given one of said plurality of receivers, responsive to said one of said at least one old account number associated with said given one of said plurality of receivers and said at least one new account number associated with said given one of said plurality of receivers being contained in said conversion data structure in association with said another one of said at least one old account number associated with said given one of said plurality of receivers and said at least one new account number associated with said given one of said plurality of receivers.

23. A computer program product comprising a tangible computer useable recordable storage medium including computer usable program code facilitating account restructuring in an electronic bill payment system with a plurality of participating entities comprising a plurality of receivers and a plurality of originators, said computer program product including:
  computer usable program code for obtaining a data file indicative of an account restructuring of a given one of said plurality of receivers, said data file specifying at least one first account number criterion associated with said given one of said plurality of receivers and at least one second account number criterion associated with said given one of said plurality of receivers;
  computer usable program code for placing said at least one first account number criterion and said at least one second account number criterion of said given one of said plurality of receivers in a conversion data structure in a format to facilitate account restructuring;
  computer usable program code for obtaining remittance data from a given one of said plurality of originators, said remittance data comprising an indication of an account number associated with said given one of said plurality of receivers;
  computer usable program code for routing said remittance data to said given one of said plurality of receivers if said indication of said account number satisfies said at least one first account number criterion; and
  computer usable program code for routing said remittance data back to said given one of said plurality of originators if said indication of said account number satisfies said at least one second account number criterion;
  wherein said remittance data comprises a payment.

24. The computer program product of claim 23, wherein:
  each of said receivers in said plurality of receivers comprises at least one of:
    one of a plurality of billers;
    one of a plurality of concentrators; and
    one of said plurality of concentrators acting on behalf of at least one biller of said plurality of billers; and
  each of said originators comprises a bill payment originator.

25. An apparatus for facilitating account restructuring in an electronic bill payment system with a plurality of participating entities comprising a plurality of receivers and a plurality of originators, said apparatus comprising:
  a memory; and
  at least one processor coupled to said memory, said at least one processor being operative to:
    obtain a data file indicative of an account restructuring of a given one of said plurality of receivers, said data file specifying at least one old account number associated with said given one of said plurality of receivers and at least one new account number associated with said given one of said plurality of receivers;
    place said at least one old account number and said at least one new account number associated with said given one of said plurality of receivers in a conversion data structure in a format to facilitate account number conversion;

obtain remittance data from a given one of said participating entities, said remittance data comprising an indication of one of said old account number of said given one of said plurality of receivers and said new account number of said given one of said plurality of receivers; and route said remittance data in accordance with:
said one of said old account number of said given one of said plurality of receivers and said new account number of said given one of said plurality of receivers; and
said conversion data structure;

wherein:
said remittance data comprises one of a payment and a reversal;
said given one of said participating entities comprises a given one of said plurality of originators; and
said at least one processor is operative to route said remittance data by routing said one of a payment and a reversal to a single new account number associated with said given one of said plurality of receivers.

26. The apparatus of claim 25, wherein:
each of said receivers in said plurality of receivers comprises at least one of:
one of a plurality of billers;
one of a plurality of concentrators; and
one of said plurality of concentrators acting on behalf of at least one biller of said plurality of billers; and
each of said originators comprises a bill payment originator.

27. The apparatus of claim 26, wherein said at least one processor is operative to route said remittance data at least by being operative to:
check said remittance data to determine whether said one of said at least one old account number associated with said given one of said plurality of receivers and said at least one new account number associated with said given one of said plurality of receivers is contained in said conversion data structure; and
identify said payment remittance data as destined for another one of said at least one old account number associated with said given one of said plurality of receivers and said at least one new account number associated with said given one of said plurality of receivers, responsive to said one of said at least one old account number associated with said given one of said plurality of receivers and said at least one new account number associated with said given one of said plurality of receivers being contained in said conversion data structure in association with said another one of said at least one old account number associated with said given one of said plurality of receivers and said at least one new account number associated with said given one of said plurality of receivers.

28. An apparatus for facilitating account restructuring in an electronic bill payment system with a plurality of participating entities comprising a plurality of receivers and a plurality of originators, said apparatus comprising:
a memory; and
at least one processor coupled to said memory, said at least one processor being operative to:
obtain a data file indicative of an account restructuring of a given one of said plurality of receivers, said data file specifying at least one first account number criterion associated with said given one of said plurality of receivers and at least one second account number criterion associated with said given one of said plurality of receivers;
place said at least one first account number criterion and said at least one second account number criterion of said given one of said plurality of receivers in a conversion data structure in a format to facilitate account restructuring;
obtain remittance data from a given one of said plurality of originators, said remittance data comprising an indication of an account number associated with said given one of said plurality of receivers;
route said remittance data to said given one of said plurality of receivers if said indication of said account number satisfies said at least one first account number criterion; and
route said remittance data back to said given one of said plurality of originators if said indication of said account number satisfies said at least one second account number criterion;

wherein said remittance data comprises a payment.

29. The apparatus of claim 28, wherein:
each of said receivers in said plurality of receivers comprises at least one of:
one of a plurality of billers;
one of a plurality of concentrators; and
one of said plurality of concentrators acting on behalf of at least one biller of said plurality of billers; and
each of said originators comprises a bill payment originator.

30. A computer program product comprising a tangible computer useable recordable storage medium including computer usable program code for facilitating account restructuring in an electronic bill payment system with a plurality of participating entities comprising a plurality of receivers and a plurality of originators, said computer program product including:
computer usable program code for obtaining a data file indicative of an account restructuring of a given one of said plurality of receivers, said data file specifying at least one old account number associated with said given one of said plurality of receivers and at least one new account number associated with said given one of said plurality of receivers;
computer usable program code for placing said at least one old account number and said at least one new account number associated with said given one of said plurality of receivers in a conversion data structure in a format to facilitate account number conversion;
computer usable program code for obtaining remittance data from a given one of said participating entities, said remittance data comprising an indication of one of said old account number of said given one of said plurality of receivers and said new account number of said given one of said plurality of receivers; and
computer usable program code for routing said remittance data in accordance with:
said one of said old account number of said given one of said plurality of receivers and said new account number of said given one of said plurality of receivers; and
said conversion data structure;

wherein:
said remittance data comprises one of a payment and a reversal;
said data file specifies a plurality of new account numbers associated with said old account number of said given one of said plurality of receivers; and said computer usable program code for routing comprises computer usable program code for routing said remittance data in accordance with said plurality of new account numbers associated with said old account number of said given one of said plurality of receivers.

31. An apparatus for facilitating account restructuring in an electronic bill payment system with a plurality of participating entities comprising a plurality of receivers and a plurality of originators, said apparatus comprising:
- a memory; and
- at least one processor coupled to said memory, said at least one processor being operative to:
  - obtain a data file indicative of an account restructuring of a given one of said plurality of receivers, said data file specifying at least one old account number associated with said given one of said plurality of receivers and at least one new account number associated with said given one of said plurality of receivers;
  - place said at least one old account number and said at least one new account number associated with said given one of said plurality of receivers in a conversion data structure in a format to facilitate account number conversion;
  - obtain remittance data from a given one of said participating entities, said remittance data comprising an indication of one of said old account number of said given one of said plurality of receivers and said new account number of said given one of said plurality of receivers; and
  - route said remittance data in accordance with:
    - said one of said old account number of said given one of said plurality of receivers and said new account number of said given one of said plurality of receivers; and
    - said conversion data structure;
- wherein:
  - said remittance data comprises one of a payment and a reversal;
  - said data file specifies a plurality of new account numbers associated with said old account number of said given one of said plurality of receivers; and
  - said at least one processor is operative to route said remittance data by routing said remittance data in accordance with said plurality of new account numbers associated with said old account number of said given one of said plurality of receivers.

* * * * *